(12) United States Patent
Lanham et al.

(10) Patent No.: US 8,573,067 B2
(45) Date of Patent: Nov. 5, 2013

(54) FLOW METER INCLUDING A BALANCE MEMBER

(75) Inventors: Gregory Treat Lanham, Longmont, CO (US); Christopher A Werbach, Longmont, CO (US); Andrew Timothy Patten, Boulder, CO (US)

(73) Assignee: Micro Motion, Inc., Boulder, CO (US)

( * ) Notice: Subject to any disclaimer, the term of this patent is extended or adjusted under 35 U.S.C. 154(b) by 178 days.

(21) Appl. No.: 13/320,088

(22) PCT Filed: May 26, 2009

(86) PCT No.: PCT/US2009/045165
§ 371 (c)(1),
(2), (4) Date: Nov. 11, 2011

(87) PCT Pub. No.: WO2010/138111
PCT Pub. Date: Dec. 2, 2010

(65) Prior Publication Data
US 2012/0055260 A1 Mar. 8, 2012

(51) Int. Cl.
*G01F 1/84* (2006.01)

(52) U.S. Cl.
USPC .................................................. 73/861.355

(58) Field of Classification Search
USPC ...................................... 73/861.355–861.357
See application file for complete search history.

(56) References Cited

U.S. PATENT DOCUMENTS

| 5,497,666 | A | * | 3/1996 | Patten et al. | 73/861.355 |
| RE36,376 | E | * | 11/1999 | Cage et al. | 73/861.355 |
| 6,318,186 | B1 | * | 11/2001 | Smith et al. | 73/861.356 |
| 6,666,098 | B2 | | 12/2003 | Drahm et al. | |
| 7,802,484 | B2 | * | 9/2010 | Pankratz et al. | 73/861.355 |
| 2007/0151370 | A1 | | 7/2007 | Bitto et al. | |
| 2010/0326203 | A1 | * | 12/2010 | Lanham et al. | 73/861.354 |
| 2011/0247433 | A1 | * | 10/2011 | Werbach et al. | 73/861.357 |

FOREIGN PATENT DOCUMENTS

| CN | 1048099 A | 12/1990 |
| CN | 101019008 A | 8/2007 |
| DE | 102005046319 A1 | 3/2007 |
| EP | 1253409 A1 | 10/2002 |
| RU | 2182696 C2 | 5/2002 |
| RU | 2235295 C2 | 8/2004 |
| RU | 2275606 C2 | 4/2006 |
| RU | 2344377 C1 | 1/2009 |
| WO | 9807009 A1 | 2/1998 |
| WO | 0102816 A2 | 1/2001 |
| WO | 03021204 A1 | 3/2003 |
| WO | 2006010687 A1 | 2/2006 |

* cited by examiner

*Primary Examiner* — Jewel V Thompson
(74) *Attorney, Agent, or Firm* — The Ollila Law Group LLC

(57) ABSTRACT

A flow meter (200) is provided that comprises a curved flow tube (203) and a balance member (250). The balance member (250) is positioned such that a centerline (341) of the balance member (250) lies on a plane of a centerline (340) of the curved flow tube (203). The flow meter (200) also includes a driver (104) including a first driver component (104a) and a second driver component (104b). The first driver component (104a) is coupled to the curved flow tube (203) while the second driver component (104b) is coupled to the balance member (250) proximate the first driver component (104a). The flow meter (200) also includes at least a first pick-off sensor (105). The first pick-off sensor (105) includes a first pick-off component (105a) and a second pick-off component (105b). The first pick-off component (105a) is coupled to the curved flow tube (203) while the second pick-off component (105b) is coupled to the balance member (250) proximate the first pick-off component (105a).

22 Claims, 4 Drawing Sheets

FLOW METER INCLUDING A BALANCE MEMBER

TECHNICAL FIELD

The present invention relates to, a flow meter and more particularly, to a flow meter including a balance member.

BACKGROUND OF THE INVENTION

It is generally known to use Coriolis effect mass flow meters to measure mass flow and other information for materials flowing through a conduit in the flow meter. Exemplary Coriolis flow meters are disclosed in U.S. Pat. Nos. 4,109,524, 4,491,025, and Re. 31,450 all to J. E. Smith et al. These flow meters have one or more conduits of straight or curved configuration. Each conduit configuration in a Coriolis mass flow meter has a set of natural vibration modes, which may be of simple bending, torsional, or coupled type. Each conduit can be driven to oscillate at a preferred mode.

Material flows into the flow meter from a connected pipeline on the inlet side of the flow meter, is directed through the conduit(s), and exits the flow meter through the outlet side of the flow meter. The natural vibration modes of the vibrating, material filled system are defined in part by the combined mass of the conduits and the material flowing within the conduits.

When there is no flow through the flow meter, a driving force applied to the conduit(s) causes all points along the conduit(s) to oscillate with identical phase or small initial fixed phase offset, which can be corrected. As material begins to flow through the flow meter, Coriolis forces cause each point along the conduit(s) to have a different phase. For example, the phase at the inlet end of the flow meter lags the phase at the centralized driver position, while the phase at the outlet leads the phase at the centralized driver position. Pick-off sensors on the conduit(s) produce sinusoidal signals representative of the motion of the conduit(s). Signals output from the pick-off sensors are processed to determine the phase difference between the pick-off sensors. The phase difference between the two or more pick-off sensors is proportional to the mass flow rate of material flowing through the conduit(s).

Meter electronics connected to the driver generates a drive signal to operate the driver and determines a mass flow rate and other properties of a material from signals received from the pick-off sensors. The driver may comprise one of many well known arrangements; however, a magnet and an opposing drive coil has received great success in the flow meter industry. An alternating current is passed to the drive coil for vibrating the conduit(s) at a desired flow tube amplitude and frequency. It is also known in the art to provide the pick-off sensors as a magnet and coil arrangement very similar to the driver arrangement. However, while the driver receives a current which induces a motion, the pick-off sensors can use the motion provided by the driver to induce a voltage.

The magnitude of the time delay measured by the pick-off sensors is very small; often measured in nanoseconds. Therefore, it is necessary to have the transducer output be very accurate. Transducer accuracy may be compromised by non-linearities and asymmetries in the meter structure or from motion arising from extraneous forces. For example, a Coriolis mass flow meter having unbalanced components can vibrate its case, flanges, and the pipeline at the drive frequency of the meter. This vibration perturbs the time delay signal in an amount that depends on the rigidity of the mount. Since the rigidity of the mount is generally unknown and can change over time and temperature, the effects of the unbalanced components generally cannot be compensated and may significantly affect meter performance. The effects of these unbalanced vibrations and mounting variations can be reduced by using flow meter designs that are balanced and by using signal processing techniques to compensate for unwanted component motion.

Typical dual tube Coriolis flow meter designs split the flow of material into two streams using manifolds and send the two streams of material into the two separate flow tubes. The two tubes are typically symmetrical in shape and mounted parallel to one-another. The two tubes typically vibrate at the same frequency but in opposite phase. Because the tubes are symmetrical and vibrated opposite each other, the vibrations typically cancel out where the two tubes are joined. This creates a balanced flow meter (i.e., little or no vibration of the meter at the manifolds). A change in density in the material flowing through the two tubes changes the mass of both tubes substantially equally and therefore, the two tubes remain balanced across a wide range of material densities.

There are certain applications where dual tube meters are not wanted due to the pressure drop and/or plugging issues created by the manifold, for example. In these situations, a single tube meter is often desirable. A problem with single tube Coriolis flow meters is that they can become imbalanced with changing fluid densities. As the density of the fluid flowing through the flow meter changes, the center of mass of the flow meter also changes. This imbalance can have adverse effects on the meter's performance and reliability.

Therefore, there is a need in the art for a single tube flow meter that is capable of remaining balanced over a wide range of material densities. There are a number of prior art attempts, none of which have provided satisfactory results over a wide range of fluid densities. For example, some single tube flow meters have incorporated a separate counter-balance bar. While such a solution may provide acceptable results for limited fluid density ranges, if both the driver components and pick-off components are not connected to the balance bar, the solution is incomplete. Another prior art solution has been to reference the flow tube's vibration against a rigid mounting plate. Although this provides adequate results in an ideal situation, it is often difficult to create an absolutely stable mounting plate. Therefore, external vibrations that are translated to the mounting plate can adversely affect the meter's performance.

Another prior art solution is introduced in U.S. Pat. No. 6,666,098, which discloses the use of a counter tube that runs parallel to the flow tube. One potential problem with this design lies in the fact that the flow tube and the counter tube must be made of substantially the same material and have approximately the same mass distribution. The same mass distribution is essential to maintain a balanced system in this prior art approach. Furthermore, because the flow tube and the counter tube extend parallel to one another and are therefore approximately the same length, the two should be made of the same material. If the flow tube and counter tube comprise different materials having different thermal coefficients of expansion, changes in temperature may create axial stresses in the flow tube resulting in erroneous measurements. While this may not seem to be a significant problem, it should be appreciated that in many circumstances it is desirable to provide a flow tube having a relatively low thermal coefficient of expansion, such as titanium or zirconium. However, such materials are often expensive. By requiring both the flow tube and the counter tube to be formed from an expensive material, the cost of manufacturing the flow meter is significantly increased.

The present invention overcomes this and other problems and an advance in the art is achieved. It should be appreciated however, that while the present invention overcomes difficulties that are particularly prevalent with single tube designs, the invention is equally applicable to dual tube meters. Although the description that follows is directed mainly towards Coriolis flow meters, it should be appreciated that the invention is equally applicable to other vibrating structures that lack the measurement capabilities of Coriolis flow meters, such as vibrating densitometers.

SUMMARY OF THE INVENTION

A flow meter is provided according to an embodiment of the invention. The flow meter comprises a curved flow tube and a balance member. According to an embodiment of the invention, the balance member is positioned such that a centerline of the balance member lies on a plane of a centerline of the flow tube. A driver is provided including a first driver component coupled to the flow tube and a second driver component coupled to the balance member proximate the first driver component. According to an embodiment of the invention, the flow meter also includes a pick-off sensor including a first pick-off component coupled to the flow tube and a second pick-off component coupled to the balance member proximate the first pick-off component.

According to an embodiment of the invention, a method of forming a flow meter including a curved flow tube and a balance member is provided. The method comprises the step of positioning the balance member proximate the flow tube such that a centerline of the balance member is located on a plane of a centerline of the flow tube. The method also comprises the step of coupling a first driver component to the flow tube and a second driver component to the balance member proximate the first driver component. According to an embodiment of the invention, the method also includes the step of coupling a first pick-off component to the flow tube and a second pick-off component to the balance member proximate the first pick-off component.

Aspects

According to an aspect of the invention, a flow meter comprises:
  a curved flow tube;
  a balance member positioned such that a centerline of the balance member lies on a plane of a centerline of the curved flow tube;
  a driver including a first driver component coupled to the flow tube and a second driver component coupled to the balance member proximate the first driver component; and
  at least a first pick-off sensor including a first pick-off component coupled to the flow tube and a second pick-off component coupled to the balance member proximate the first pick-off component.

Preferably, the flow meter further comprises a counter weight coupled to the flow tube opposite the first driver component.

Preferably, the counter weight is sized and located such that a combined center of mass of the counter weight and the first driver component is located on a plane of the centerline of the flow tube.

Preferably, the flow meter further comprises a counter weight coupled to the balance member opposite the second driver component.

Preferably, the counter weight is sized and located such that a combined center of mass of the counter weight, the second driver component, and a bracket is located on a plane of the centerline of the balance member.

Preferably, the flow meter further comprises a counter weight coupled to the flow tube opposite the first pick-off component.

Preferably, the counter weight is sized and located such that a combined center of mass of the counter weight and the first pick-off component is located on a plane of the centerline of the flow tube.

Preferably, the flow meter further comprises a counter weight coupled to the balance member opposite the second pick-off component.

Preferably, the counter weight is sized and located such that a combined center of mass of the counter weight, the second pick-off component, and a bracket is located on a plane of the centerline of the balance member.

Preferably, wherein the balance member is positioned within an inner bend region of the curved flow tube.

Preferably, the flow meter further comprises a plurality of brace bars coupled to the flow tube and the balance member to at least partially define a flow tube bending axis and a balance member bending axis.

According to another aspect of the invention, a method of forming a flow meter including a curved flow tube and a balance member, comprising the steps of:
  positioning the balance member proximate the flow tube such that a centerline of the balance member is located on a plane of a centerline of the curved flow tube;
  coupling a first driver component to the flow tube and a second driver component to the balance member proximate the first driver component; and
  coupling a first pick-off component to the flow tube and a second pick-off component to the balance member proximate the first pick-off component.

Preferably, the method further comprises the step of coupling a counter weight to the flow tube opposite a first driver component.

Preferably, the method further comprises the step of sizing and locating the counter weight such that a combined center of mass of the counter weight and the first driver component is located on a plane of the centerline of the curved flow tube.

Preferably, the method further comprises the step of coupling a counter weight to the balance member opposite the second driver component.

Preferably, the method further comprises the step of sizing and locating the counter weight such that a combined center of mass of the counter weight and the second driver component is located on a plane of the centerline of the balance member.

Preferably, the method further comprises the step of coupling a counter weight to the flow tube opposite the first pick-off component.

Preferably, the method further comprises the step of sizing and locating the counter weight such that a combined center of mass of the counter weight and the first pick-off component is located on a plane of the centerline of the flow tube.

Preferably, the method further comprises the step of coupling a counter weight to the balance member opposite the second pick-off component.

Preferably, the method further comprises the step of sizing and locating the counter weight such that a combined center of mass of the counter weight, the second pick-off component, and a bracket is located on a plane of the centerline of the balance member.

Preferably, the step of positioning the balance member proximate the flow tube comprises positioning the balance member within an inner bend region of the flow tube.

Preferably, the method further comprises the step of coupling a plurality of brace bars to the flow tube and the balance member to at least partially define a flow tube bending axis and a balance member bending axis.

DETAILED DESCRIPTION OF THE INVENTION

FIGS. 1-4 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
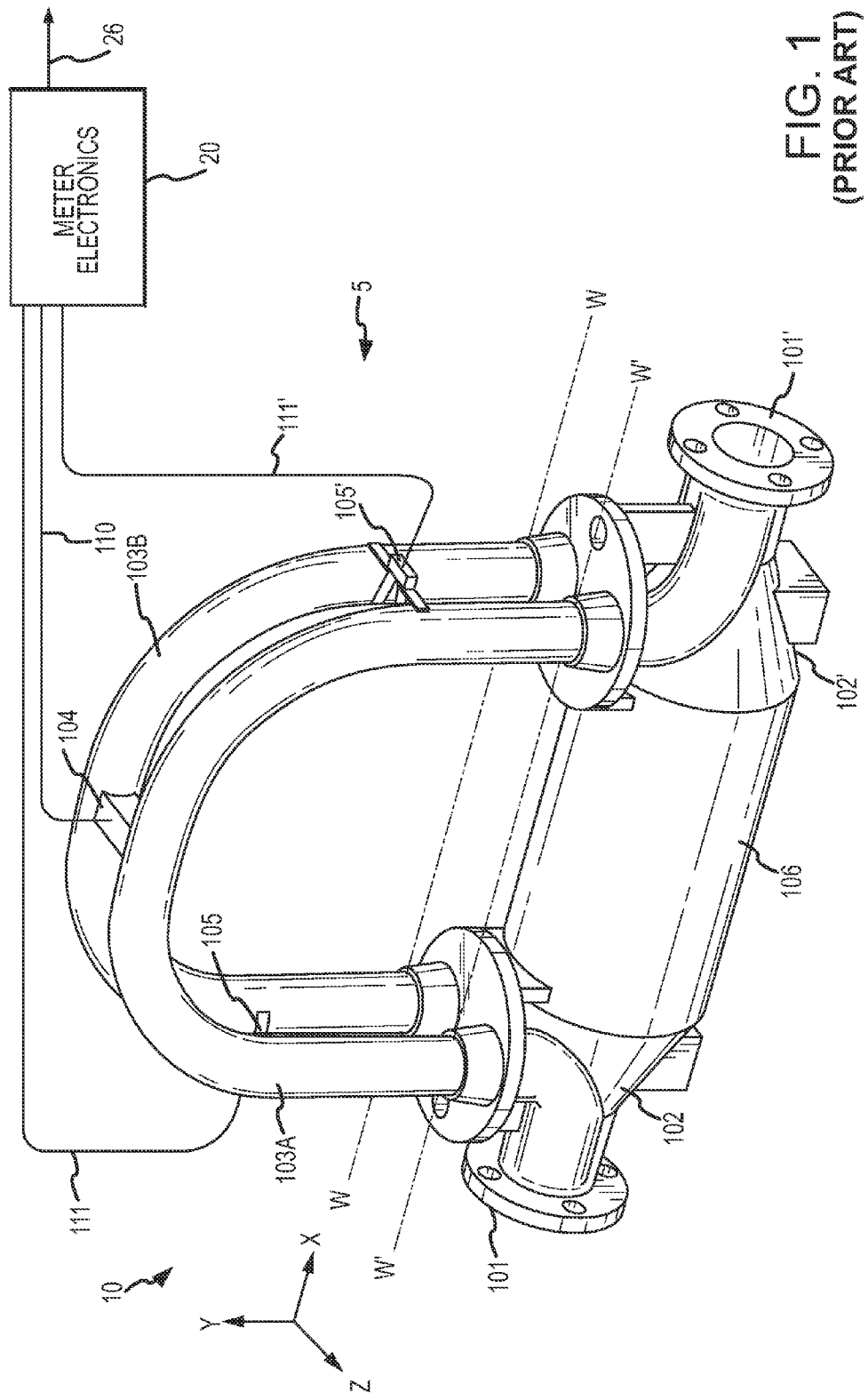
FIG. 1 shows a prior art vibrating sensor assembly.

FIG. 1 illustrates an example of a prior art vibrating sensor assembly 5 in the form of a Coriolis flow meter comprising a flow meter 10 and one or more meter electronics 20. The one or more meter electronics 20 are connected to flow meter 10 to measure a characteristic of a flowing material, such as, for example, density, mass flow rate, volume flow rate, totalized mass flow, temperature, and other information.

The flow meter 10 includes a pair of flanges 101 and 101', manifolds 102 and 102', and conduits 103A and 103B. Manifolds 102, 102' are affixed to opposing ends of the conduits 103A, 103B. Flanges 101 and 101' of the present example are affixed to manifolds 102 and 102'. Manifolds 102 and 102' of the present example are affixed to opposite ends of spacer 106. Spacer 106 maintains the spacing between manifolds 102 and 102' in the present example to prevent undesired vibrations in conduits 103A and 103B. The conduits 103A, 103B extend outwardly from the manifolds 102, 102' in an essentially parallel fashion. When flow meter 10 is inserted into a pipeline system (not shown) which carries the flowing material, the material enters the flow meter 10 through the flange 101, passes through the inlet manifold 102 where the total amount of material is directed to enter the conduits 103A and 103B in approximately equal amounts, flows through the conduits 103A and 103B and back into the outlet manifold 102' where it exits the flow meter 10 through the flange 101'.

The flow meter 10 includes a driver 104. The driver 104 is affixed to conduits 103A, 103B in a position where the driver 104 can vibrate the conduits 103A, 103B in the drive mode. More particularly, the driver 104 includes a first driver component (not shown) affixed to conduit 103A and a second driver component (not shown) affixed to conduit 103B. Driver 104 may comprise one of many well known arrangements, such as a magnet mounted to the conduit 103A and an opposing coil mounted to the conduit 103B. Other examples include piezo-electric drivers, acoustic drivers, etc.

In the present example, the drive mode is the first out of phase bending mode and the conduits 103A and 103B are preferably selected and appropriately mounted to inlet manifold 102 and outlet manifold 102' so as to provide a balanced system having substantially the same mass distribution, moments of inertia, and elastic modules about bending axes W-W and W'-W', respectively. In the present example, where the drive mode is the first out of phase bending mode, the conduits 103A and 103B are driven by driver 104 in opposite directions about their respective bending axes W and W'. A drive signal in the form of an alternating current can be provided by one or more meter electronics 20, such as for example via pathway 110, and passed through the coil to cause both conduits 103A, 103B to oscillate.

The balanced system described above vibrates the flow conduits 103A, 103B generally in the Z-direction according to the coordinate system shown. Other directions include the X-direction along the pipeline and the Y-direction, which is perpendicular to both the Z and X-directions. This coordinate system is used throughout the application and may aid in the understanding of the invention. It should be appreciated that other coordinate systems may be used and the particular coordinate system used should not limit the scope of the present invention.

Those of ordinary skill in the art will appreciate that other drive modes may be used within the scope of the present invention. By way of example, the drive mode may be a twist mode as is known in the art.

In the example shown in FIG. 1, the one or more meter electronics 20 receive the pick-off signals from the pick-offs 105, 105'. Path 26 provides an input and an output means that allows one or more meter electronics 20 to interface with an operator (not shown). The one or more meter electronics 20 measure a characteristic of a flowing material, such as, for example, density, mass flow rate, volume flow rate, totalized mass flow, temperature, and other information. More particularly, the one or more meter electronics 20 receive one or more signals, for example, from pick-offs 105, 105' and one or more temperature sensors (not shown), and use this information to measure a characteristic of a flowing material, such as, for example, density, mass flow rate, volume flow rate, totalized mass flow, temperature, and other information.

The techniques by which vibrating measuring devices, such as, for example, Coriolis flow meters or densitometers, measure a characteristic of a flowing material are well understood; see, for example, U.S. Pat. No. 6,505,131, the disclosure of which is hereby incorporated herein by reference; therefore, a detailed discussion is omitted for brevity of this description.

Figure 2:
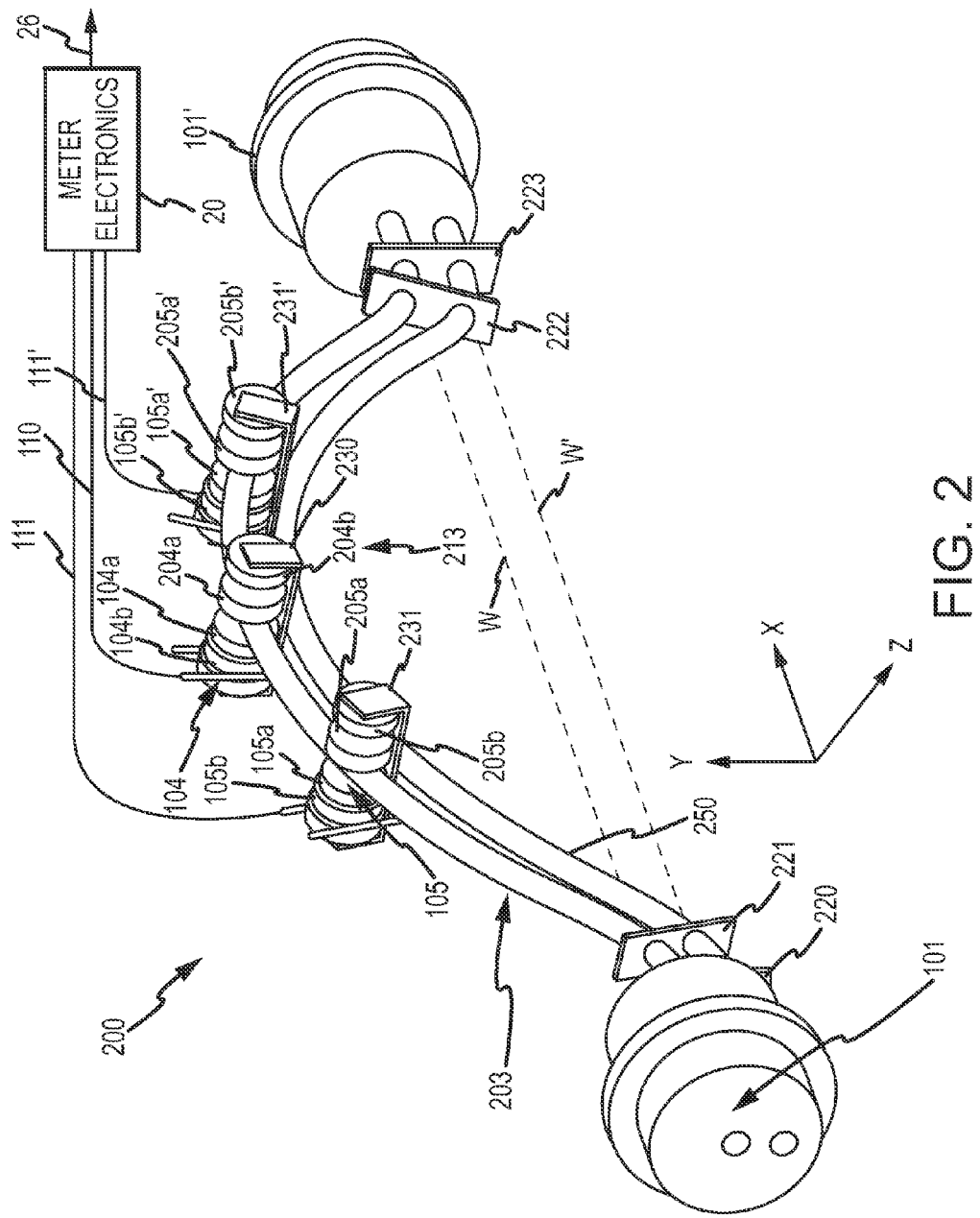
FIG. 2 shows a single tube flow meter according to an embodiment of the invention.

FIG. 2 shows a flow meter 200 according to an embodiment of the invention. The flow meter 200 may comprise a Coriolis flow meter or may comprise a vibrating system that lacks all of the measuring capabilities of a Coriolis flow meter, such as a vibrating densitometer, for example. According to an embodiment of the invention, the flow meter 200 can include a curved flow tube 203, a balance member 250, an inlet flange 101, and an outlet flange 101'. Flow meter 200 is adapted when in use to be connected via flanges 101 and 101' to a pipeline or the like.

According to an embodiment of the invention, the flow meter 200 may include one or more sensor components 104, 105, 106. According to the embodiment shown, the flow meter 200 includes a driver 104 and two pick-off sensors 105, 105'. Although only two pick-off assemblies 105, 105' are shown, it should be appreciated that the flow meter 200 may include a single pick-off assembly 105 or more than two pick-off assemblies. Furthermore, in some embodiments, the driver 104 may comprise the pick-off assembly as well as the driving assembly. According to an embodiment of the invention, the driver 104 and pick-off sensors 105, 105' can communicate with a meter electronics 20 via leads 110, 111, 111' in a similar manner as described above in relation to the prior art vibrating sensor assembly 5.

According to an embodiment of the invention, the driver 104 comprises a first driver component 104a and a second driver component 104b. According to an embodiment of the invention, the first driver component 104a is coupled to the flow tube 203. According to another embodiment of the invention, the second driver component 104b is coupled to the balance member 250 proximate the first driver component 104a. The driver components 104a, 104b may be coupled to the flow tube 203 and balance member 250 according to generally known methods including, for example, brazing, bonding, welding, adhesives, mechanical fasteners, etc. In the embodiment shown, the first driver component 104a comprises a driver magnet while the second driver component 104b comprises a driver coil. However, it should be appreciated that the driver components could be reversed, i.e., the first driver component 104a could comprise the driver coil while the second driver component 104b could comprise the driver magnet. Furthermore, the driver 104 does not have to comprise a magnet/coil combination. As mentioned above there are various alternative drivers including, for example, piezo-electric and acoustic drivers. Therefore, the particular driver component coupled to the flow tube 101 and the balance member 250 should not limit the scope of the present invention. The important aspect is that one of the driver components is coupled to the flow tube 101 while the other driver component is coupled to the balance member 250.

Similarly, the first and second pick-off sensors 105, 105' comprise first components 105a, 105a' and second components 105b, 105b'. As shown, the first pick-off component 105a, 105a' is coupled to the flow tube 203 while the second pick-off component 105b, 105b' is coupled to the balance member 250 proximate the first pick-off component 105a, 105a'. Therefore, the pick-off components can interact with one another as is generally known in the art. Although the first pick-off component 105a, 105a' is shown as comprising the pick-off magnet and the second pick-off component 105b, 105b' is shown as comprising the pick-off coil, the first and second pick-off components could be reversed. Therefore, the particular component coupled to the flow tube 203 and the balance member 250 should not limit the scope of the present invention. Furthermore, it should be appreciated that the pick-off sensors 105, 105' are not limited to magnet/coil configurations. Rather, the pick-off sensors 105, 105' may comprise any of the well-known pick-off configurations including magnet/coil, optical, capacitance sensors, etc.

With the second driver component 104b and the second pick-off components 105b, 105b' coupled to the balance member 250, the sensor components 104, 105, 105' are substantially isolated from external vibrations that may otherwise be transmitted to the components. For example, in the prior art system where the pick-off components were coupled to a stationary reference plate, external vibrations could be experienced, thereby resulting in erroneous measurements. However, the present invention substantially isolates the sensor components thereby reducing the chances of erroneous measurements.

According to an embodiment of the invention, the sensor components 104, 105, 105' are coupled to the flow tube 203 and/or balance member 250 using brackets 230, 231, 231'. The brackets 230, 231, 231' can be coupled to one of the flow tube 203 or the balance member 250. In the embodiment shown, the brackets 230, 231, 231' are coupled to the balance member 250. According to the embodiment shown in FIG. 2, the brackets 230, 231, 231' are provided to couple the second sensor components 104b, 105b, 105b' to the balance member 250. Advantageously, the second sensor components 104b, 105b, 105b' can extend beyond the balance member 250 in order to interact with the first sensor components 104a, 105a, 105a'.

In addition to the brackets 230, 231, 231', according to an embodiment of the invention, the flow meter 200 may also include a plurality of counter weights 204a, 204b, 205a, 205b, 205a', 205b'. The counter weights 204a, 204b, 205a, 205b, 205a', 205b' can be provided to balance the weight of the sensor components 104, 105, 105'. For example, according to an embodiment of the invention, the first driver component 104a is coupled to a first side of the flow tube 203. In order to balance the weight of the first driver component 104a, the counter weight 204a can be coupled to the flow tube 203 opposite the first driver component 104a on a second side of the flow tube 203. Similarly, the second driver component 104b can be coupled to a first side of the bracket 230. In order to balance the weight of the second driver component 104b, the counter weight 204b can be coupled to the bracket 230 opposite the second driver component 104b. According to an embodiment of the invention, the counter weights can be sized and located such that the combined center of mass of the sensor components and the balance weights lie proximate a plane of the centerline of the flow tube 203 and the balance member 250. It should be appreciated that while it is desirable to locate the combined center of mass on the X-Y plane of the centerline, due to machining tolerances, it may be prohibitively expensive to provide exact balancing and therefore, some variation away from the plane of the centerline may be acceptable in certain situations. However, it should be appreciated that as the combined center of mass is moved closer to the plane of the flow tube centerline, the undesired vibrations experienced during operation decrease. This sort of balancing is explained in more detail in U.S. Pat. No. 7,287,438, which is hereby incorporated by reference.

In a similar manner, the counter weight 204b coupled to the bracket 230 can be sized and located such that the combined center of mass of the second driver component 104b, the counter weight 204b, and the bracket 230 lies proximate a plane of the centerline of the balance member 250. Sizing and locating the counter weight 204b in this manner provides the same benefits as described above with respect to the first driver component 104a. It should be appreciated that a similar balancing can be performed for the pick-off sensors 105, 105'.

As shown in FIG. 2, the flow tube 203 comprises a curved flow tube with the shape of the flow tube 203 defining an inner bend region 213. The inner bend region 213 comprises the area generally beneath the curved flow tube 203 and between the inlet and outlet flanges 101, 101' as shown in FIG. 2. In the embodiment shown in FIG. 2, the balance member 250 is "nested" within the inner bend region 213. In other words, the balance member 250 is positioned adjacent the flow tube 203 and within the inner bend region 213 of the flow tube 203. The balance member 250 is shown positioned proximate the inner bend region 213 and comprises a similar shape as the flow tube 203 except that the balance member 250 is shorter than the flow tube 203. The balance member 250 is shorter than the flow tube 203 because it is positioned in the inner bend region 213 of the flow tube 203. Therefore, the flow tube 203 substantially bends around the balance member 250. Because of the shorter balance member length, the balance member 250 can be formed from a material having a higher thermal coefficient of expansion than the thermal coefficient of expansion for the flow tube material without substantially increasing the axial stresses applied to the flow tube 203. This is because thermal coefficients of expansion are often expressed as a length per length/degree of temperature change. Therefore, as the length of a piece of material decreases, the total change in length experienced due to a change in temperature also decreases. Thus, the balance member 250 can be formed from a material having a higher thermal coefficient of expansion than the flow tube's thermal coefficient of expansion and for a given change in temperature, the total change in length of the flow tube 203 and the balance member 250 may be substantially the same. Because materials having a higher thermal coefficient of expansion are often cheaper, the balance member 250 can be formed from a cheaper material than the flow tube 203 without applying significant axial stresses to the flow tube 203 due to temperature changes. This configuration was not possible according to the prior art designs where the flow tube and counter tube were positioned side-by-side and comprised essentially the same length. The flow meter 200 of the present invention may therefore, be formed cheaper than could be realized according to the prior art. It should be appreciated that while the balance member 250 may be formed from a material different from the flow tube 203, it is well within the scope of the present invention to form the balance member 250 and the flow tube 203 of the same material.

Figure 3:
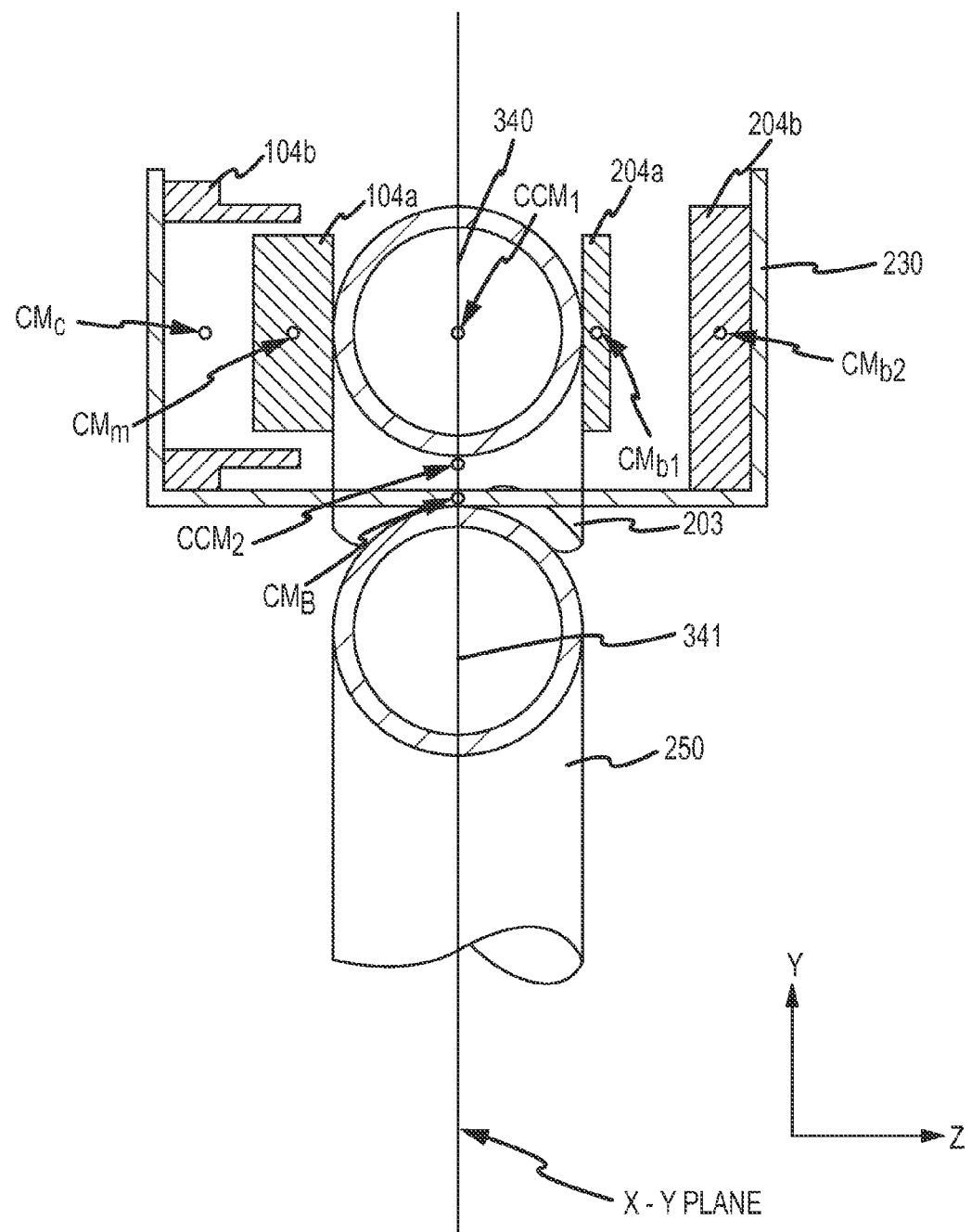
FIG. 3 shows a cross sectional view of a single tube flow meter according to an embodiment of the invention.

FIG. 3 shows a simplified X-axis cross-sectional view of the flow meter 200. As shown in FIG. 3, the centerline 340 of the flow tube 203 and the centerline 341 of the balance member 250 share a common plane, i.e., the X-Y plane according to the coordinate system described. In other words, the centerline 341 of the balance member 250 is located on, or at least proximate, the X-Y plane of the centerline 340 of the flow tube 203. Advantageously, the balance member 250 can be nested under the flow tube 203 and can be driven in phase opposition to that of the flow tube 203. It should be appreciated however, that in other embodiments the flow tube 203 could be positioned beneath the balance member 250 (the flow tube 203 could be nested under the balance member 250).

Although the balance member 250 is shown as comprising a hollow tube, it should be appreciated that the balance member 250 may alternatively comprise a substantially solid structure. Furthermore, the balance member 250 may comprise any shape, such as for example square, I-beam, irregular, etc. Therefore, the balance member 250 should not be limited to a circular tube as shown. It should be appreciated that in certain embodiments, the balance member 250 may be filled with a fluid. The fluid may comprise a fluid having a density close to the density of the fluid that is expected to flow through the flow meter 200. Alternatively, the fluid may comprise the fluid that is expected to flow through the flow meter 200. Filling the balance member 250 with a fluid can assist in adjusting the natural frequency of the balance member 250. However, it should be appreciated that the fluid flowing through the flow meter 200 does not flow through the balance member 250 during operation. Rather, the balance member 250 can be filled during the flow meter assembly, for example.

Also shown in FIG. 3 are the various centers of mass of the driver 104. As shown, coupled to the flow tube 203 is the first driver component 104a with a center of mass $CM_m$ and a counter weight 204a with a center of mass $CM_{b1}$. According to an embodiment of the invention, the counter weight 204a can be sized and located such that the combined center of mass $CCM_1$ of the first driver component 104a and the counter weight 204a is located on the X-Y plane, which is also the centerline 340 of the flow tube 203. According to an embodiment of the invention, coupled to the balance member 250 is the bracket 230 with a center of mass $CM_B$. Also coupled to the balance member 250 is the second driver component 104b with a center of mass $CM_C$, and the counter weight 204b with a center of mass $CM_{b2}$. The counter weight 204b can be sized and located on the bracket 230 such that the combined center of mass $CCM_2$ of the bracket 230, the second driver component 104b, and the counter weight 204b is located on the X-Y plane, which also comprises the centerline 341 of the balance member 250. It should be appreciated that while it is desirable to locate the combined centers of mass exactly on the X-Y plane, this may be difficult due to certain manufacturing tolerances, for example. However, it may be desirable to locate the combined centers of mass proximate the X-Y plane or as close as possible. It should also be appreciated that the pick-off sensors 105, 105' can be similarly balanced using counter weights 205a, 205b, 205a', 205b', for example and a complete discussion is omitted for brevity of the description.

Figure 4:
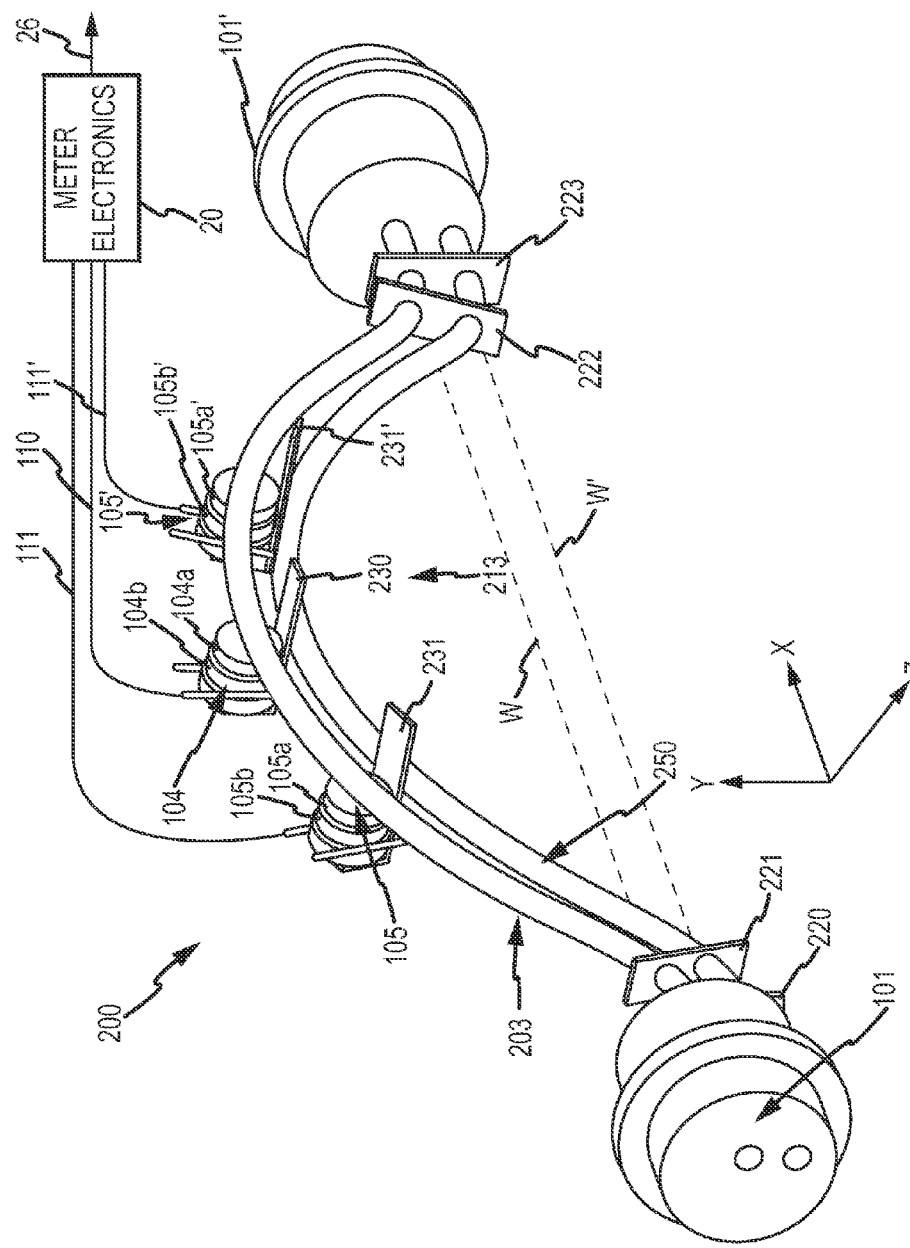
FIG. 4 shows a single tube flow meter according to another embodiment of the invention.

FIG. 4 shows the flow meter 200 according to another embodiment of the invention. The embodiment shown in FIG. 4 is similar to the previously described embodiments, however, the embodiment shown in FIG. 4 does not include the counter weights 204a, 204b, 205a, 205b, 205a', 205b'. Therefore, the flow meter 200 shown in FIG. 4 may require additional calibration to compensate for the imbalance created by the driver 104 and pick-off sensors 105, 105' that are coupled to the flow tube 203 and balance member 250. According to the embodiment shown in FIG. 4, the second driver component 104b and the second pick-off components 105b, 105b' can still be coupled to the balance member 250 using the brackets 230, 231, 231'. However, it should be appreciated that in other embodiments, the brackets 230, 231, 231' may be omitted and the second components 104b, 105b, 105b' can be coupled directly to the balance member 250. It should be appreciated that the particular method of coupling the driver 104 and pick-off sensors 105, 105' to the flow tube 203 and balance member 250 may comprise the use of adhesives, brazing, bonding, mechanical couplers, etc. The particular method used should not limit the scope of the present invention.

In operation, a drive signal can be sent to the drive coil 104b via lead 110 by meter electronics 20. The drive signal causes the flow tube 203 to vibrate about a bending axis W-W, while the balance member 250 vibrates about a bending axis W'-W'. According to an embodiment of the invention, the balance member 250 vibrates in the same mode but in phase opposition to that of the flow tube 203. According to an embodiment of the invention, the axes W-W, W'-W' are partially defined using a plurality of brace bars 220-223, which limit the active area of the flow tube 203 and the balance member 250. The vibrating tubes 203, 250 induce voltages in the pick-off sensors 105, 105', which are sent to meter electronics 20 via leads 111 and 111'. Meter electronics 20 produces mass flow information, along with other information such as material density based on the signals sent by the pick-off sensors 105, 105'. Temperature measurement devices such as RTDs (not shown) can also provide temperature measurements. Meter electronics 20 can send this information to a downstream process via lead 26.

According to an embodiment of the invention, prior to flowing a process fluid through the flow tube 203, the balance member 250 can be filled with the process fluid. This can aid in adjusting the natural frequency of the balance member 250. In other embodiments, this may not be necessary and the frequency of the balance member 250 can be adjusted according to other well known methods, such as coupling one or more additional masses to the balance member 250, for example.

With the centerline 341 of the balance member 250 being located on a plane of the centerline 340 of the flow tube 203, the flow meter 200 can be made much cheaper than could be realized in the prior art. This is because the balance member 250 can be formed from a cheaper material having a higher thermal coefficient of expansion that that of the flow tube 203. Additionally, with the balance member 250 being nested in the inner bend region 213 of the flow tube 203, the flow meter 200 may be implemented in situations where the flow meter size, and more particularly, the flow meter width, is a concern. This is because the balance member 250 does not require a significant amount of space in addition to the flow tube 203. In many embodiments, the balance member 250 does not add to the width of the flow meter 200 as the balance member 250 is nested in the inner bend region 213 of the flow tube 203. This is in contrast to the prior art flow meters that incorporated a counter tube where the counter tube was provided side-by-side with the flow tube, thereby doubling the width required by the flow meter.

The detailed descriptions of the above embodiments are not exhaustive descriptions of all embodiments contemplated by the inventors to be within the scope of the invention. Indeed, persons skilled in the art will recognize that certain elements of the above-described embodiments may variously be combined or eliminated to create further embodiments, and such further embodiments fall within the scope and teachings of the invention. It will also be apparent to those of ordinary skill in the art that the above-described embodiments may be combined in whole or in part to create additional embodiments within the scope and teachings of the invention. Thus, although specific embodiments of, and examples for, the invention are described herein for illustrative purposes, various equivalent modifications are possible within the scope of the invention, as those skilled in the relevant art will recognize. The teachings provided herein can be applied to other flow meters, and not just to the embodiments described above and shown in the accompanying figures. Accordingly, the scope of the invention should be determined from the following claims.

We claim:

1. A flow meter (200), comprising:
   a curved flow tube (203);
   a balance member (250) positioned such that a centerline (341) of the balance member (250) lies on a plane of a centerline (340) of the curved flow tube (203);
   a driver (104) including a first driver component (104a) coupled to the curved flow tube (203) and a second driver component (104b) coupled to the balance member (250) proximate the first driver component (104a); and
   at least a first pick-off sensor (105) including a first pick-off component (105a) coupled to the curved flow tube (203) and a second pick-off component (105b) coupled to the balance member (250) proximate the first pick-off component (105a).

2. The flow meter (200) of claim 1, further comprising a counter weight (204a) coupled to the flow tube (203) opposite the first driver component (104a).

3. The flow meter (200) of claim 2, wherein the counter weight (204a) is sized and located such that a combined center of mass of the counter weight (204a) and the first driver component (104a) is located on a plane of the centerline (340) of the curved flow tube (203).

4. The flow meter (200) of claim 1, further comprising a counter weight (204b) coupled to the balance member (250) opposite the second driver component (104b).

5. The flow meter (200) of claim 4, wherein the counter weight (204b) is sized and located such that a combined center of mass of the counter weight (204b), the second driver component (104b), and a bracket (230) is located on a plane of the centerline (341) of the balance member (250).

6. The flow meter (200) of claim 1, further comprising a counter weight (205a) coupled to the flow tube (203) opposite the first pick-off component (105a).

7. The flow meter (200) of claim 6, wherein the counter weight (205a) is sized and located such that a combined center of mass of the counter weight (205a) and the first pick-off component (105a) is located on a plane of the centerline (340) of the curved flow tube (203).

8. The flow meter (200) of claim 1, further comprising a counter weight (205b) coupled to the balance member (250) opposite the second pick-off component (105b).

9. The flow meter (200) of claim 8, wherein the counter weight (205b) is sized and located such that a combined center of mass of the counter weight (205b), the second pick-off component (105b), and a bracket (230) is located on a plane of the centerline (341) of the balance member (250).

10. The flow meter (200) of claim 1, wherein the balance member (250) is positioned within an inner bend region (213) of the curved flow tube (203).

11. The flow meter (200) of claim 1, further comprising a plurality of brace bars (220-223) coupled to the curved flow tube (203) and the balance member (250) to at least partially define a flow tube bending axis (W-W) and a balance member bending axis (W'-W').

12. A method of forming a flow meter including a curved flow tube and a balance member, comprising the steps of:
    positioning the balance member proximate the curved flow tube such that a centerline of the balance member is located on a plane of a centerline of the curved flow tube;
    coupling a first driver component to the curved flow tube and a second driver component to the balance member proximate the first driver component; and
    coupling a first pick-off component to the flow tube and a second pick-off component to the balance member proximate the first pick-off component.

13. The method of claim 12, further comprising the step of coupling a counter weight to the flow tube opposite a first driver component.

14. The method of claim 13, further comprising the step of sizing and locating the counter weight such that a combined center of mass of the counter weight and the first driver component is located on a plane of the centerline of the curved flow tube.

15. The method of claim 12, further comprising the step of coupling a counter weight to the balance member opposite the second driver component.

16. The method of claim 15, further comprising the step of sizing and locating the counter weight such that a combined center of mass of the counter weight and the second driver component is located on a plane of the centerline of the balance member.

17. The method of claim 12, further comprising the step of coupling a counter weight to the flow tube opposite the first pick-off component.

18. The method of claim 17, further comprising the step of sizing and locating the counter weight such that a combined center of mass of the counter weight and the first pick-off component is located on a plane of the centerline of the curved flow tube.

19. The method of claim 12, further comprising the step of coupling a counter weight to the balance member opposite the second pick-off component.

20. The method of claim 19, further comprising the step of sizing and locating the counter weight such that a combined center of mass of the counter weight, the second pick-off component, and a bracket is located on a plane of the centerline of the balance member.

21. The method of claim 12, wherein the step of positioning the balance member proximate the curved flow tube comprises positioning the balance member within an inner bend region of the curved flow tube.

22. The method of claim 12, further comprising the step of coupling a plurality of brace bars to the flow tube and the balance member to at least partially define a flow tube bending axis and a balance member bending axis.

* * * * *